United States Patent [19]
Keller

[11] 3,857,770
[45] Dec. 31, 1974

[54] REMOVAL OF CONTAMINANTS FROM HYDROCARBON LIQUIDS

[75] Inventor: Howard F. Keller, Fullerton, Calif.

[73] Assignee: Global Environmental Technologist Corporation, Houston, Tex.

[22] Filed: Jan. 3, 1972

[21] Appl. No.: 214,959

Related U.S. Application Data

[63] Continuation-in-part of Ser. No. 867,507, Oct. 20, 1969, abandoned.

[52] U.S. Cl. .............................. 204/188, 204/136
[51] Int. Cl. ........................ B03c 5/00, C01g 15/00
[58] Field of Search ........................... 204/186–191, 204/302–308, 184, 185, 136

[56] References Cited
UNITED STATES PATENTS

| 1,162,213 | 11/1915 | Bloom | 204/186 |
|---|---|---|---|
| 1,334,160 | 3/1920 | Meston | 204/186 |
| 2,116,509 | 5/1938 | Cottrell | 204/188 |
| 3,066,087 | 11/1962 | Phillips | 204/190 |
| 3,190,827 | 6/1965 | Kok et al. | 204/188 |
| 3,398,082 | 8/1968 | Lochmann et al. | 204/302 |
| 3,415,735 | 12/1968 | Brown et al. | 204/302 |

Primary Examiner—T. M. Tufariello
Attorney, Agent, or Firm—William P. Green

[57] ABSTRACT

A process and apparatus for removing dissolved contaminant molecules having a dipole moment from a hydrocarbon liquid by contacting the liquid with an electrode which is charged electrically at a high voltage from a direct current power supply, and which causes migration of the contaminant molecules to the electrode by attraction of certain of their dipole charges.

17 Claims, 9 Drawing Figures

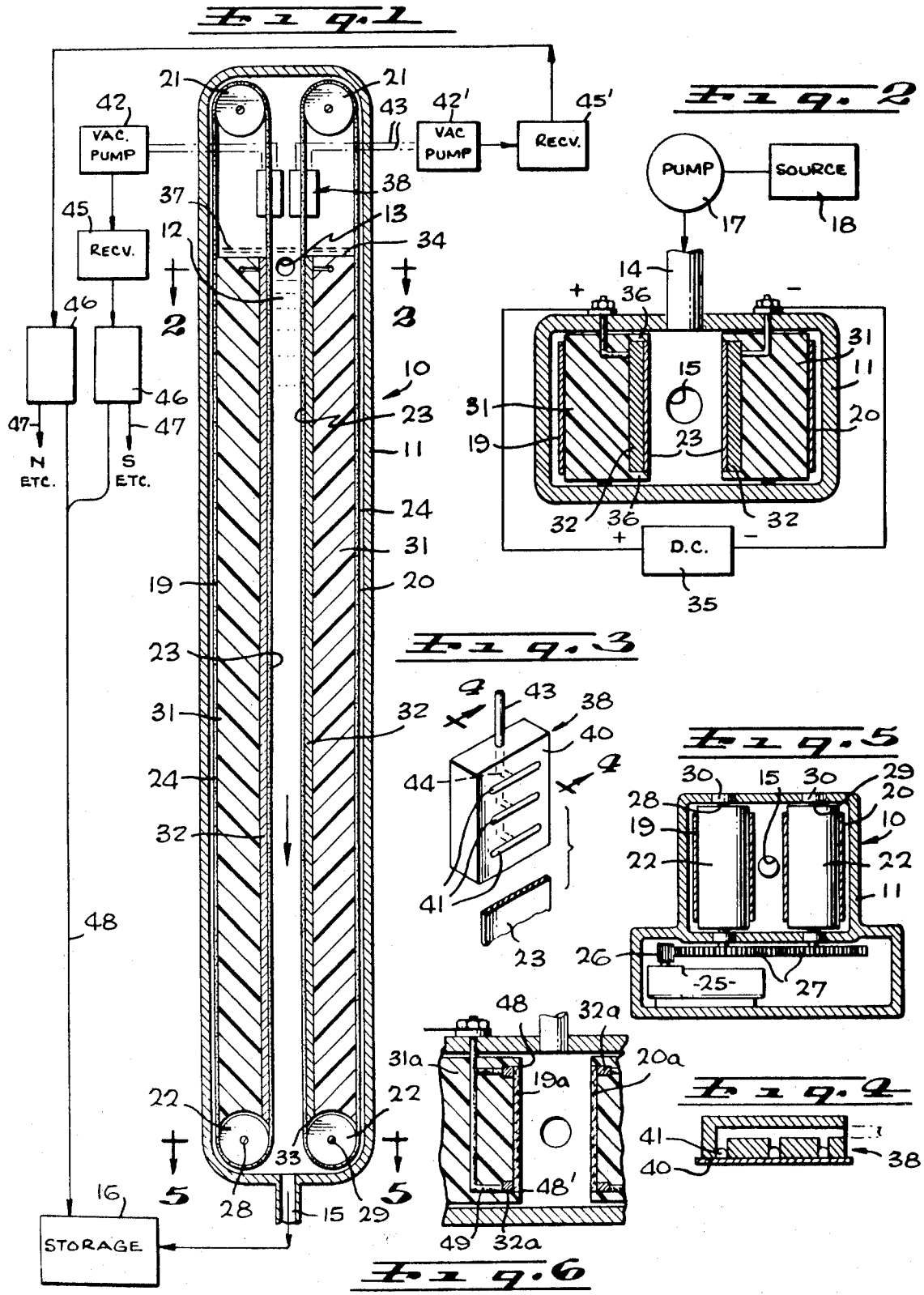

3,857,770

REMOVAL OF CONTAMINANTS FROM HYDROCARBON LIQUIDS

CROSS REFERENCE TO RELATED APPLICATION

This application is a continuation-in-part of my co-pending application Ser. No. 867,507 filed Oct. 20, 1969 on "Process and Apparatus for Removing Contaminants from a Hydrocarbon Liquid," now abandoned.

BACKGROUND OF THE INVENTION

This invention relates to improved apparatus and methods for separating contaminant molecules, e.g., molecules containing sulfur, nitrogen, oxygen, heavy metals and the like, from crude oil, refinery product streams, and other hydrocarbon liquids.

In recent years, the need in the petroleum industry for a commercially practical and effective way of removing contaminants from crude oil and its products and fractions has become increasingly more apparent. With regard particularly to sulfur and nitrogen, it is now well accepted that the presence of these substances in fuels is responsible for a large part of the pollution which plagues our cities. Because of this fact various regulations and statutes now in effect, or soon to come into effect, place extremely stringent limitations on the amounts of these contaminants which may present in a fuel. However, it is well known in the industry that many of these strict requirements, though laudable as ultimate goals, are almost impossible or at least economically impractical to attain under the conventionally used contaminant removal processes. Unless some system more effective than these conventional processes is adopted by the petroleum industry within the very near future, the fuels produced will not satisfy the statutory and other requirements, and the desired reduction in air pollution within the urban areas of the United States will not be attained.

SUMMARY OF THE INVENTION

The present invention provides an improved process and apparatus which can remove contaminants of the discussed and other types from hydrocarbon liquids, such as petroleum and its hydrocarbon fractions and products, very effectively, and in an economically practical manner. More particularly, the contaminants with which the present invention is especially concerned are of a type whose removal is rendered extremely difficult by virtue of the fact that the contaminant molecules are actually dissolved in the hydrocarbon liquid, and very strenuously resist separation from the solvent by conventional methods. To attain separation of these dissolved molecules of the contaminants from the basic hydrocarbon liquid, I make use of the fact that the contaminants which have caused the greatest problem in hydrocarbon liquids in the past are all of a type having a dipole characteristic. That is, the individual molecules of these contaminants have structural formulas which inherently cause the effective centers of the positive and negative electrical charges in the individual molecules to be separated from one another, and not be coincident, so that the contaminant molecules have a dipole moment. The molecules of the hydrocarbon liquid itself, however, do not have a dipole moment, but rather have structural formulas which are balanced, in a manner causing the effective centers of their positive and negative electrical charges to be coincident and not separated from one another.

It is found that the dipole charges on the contaminant molecules include in every instance a relatively concentrated first charge, of a first electrical polarity, at essentially the location of the sulfur, nitrogen, or other contaminant non-hydrocarbon atom or group, with an opposed electrical charge carried by the remainder of the molecule and distributed over the much larger hydrocarbon 'tail' of the molecule, and with the result that the concentrated first charge can be attracted to an electrically charged body, while the more distributed opposed charge is ineffective to resist the migration produced by the concentrated charge.

The hydrocarbon liquid containing the dissolved contaminants is therefore contacted by two electrodes which are energized oppositely by connection to opposite sides of a high voltage direct current power source, at a voltage sufficient to attract and induce migration of the dipole molecules of any particular contaminant substance toward a certain one of the electrodes. Other contaminant molecules may be similarly attracted to the opposite electrode, again by virtue of the dipole moment of those molecules, and the greater concentration in the molecules of one of the dipole charges. After such migration of the dissolved contaminant molecules, these molecules are separated from the bulk of the hydrocarbon liquid, which can then flow from the apparatus in a condition free of the contaminants or containing a substantially reduced concentration thereof.

The electrode or electrodes to which the contaminants are attracted may be formed of any suitable material, such as a metal or the like, capable of being charged at high voltage with direct current as discussed, desirably at a potential of at least about 1,000 volts per centimeter of separation of the electrodes. In the presently preferred arrangement the electrode or electrodes are formed as bodies of asbestos, which substance provides adsorptive sites to which the contaminant molecules are very readily attracted, but from which the molecules can be easily removed by locally or temporarily reducing the charge upon the asbestos. The bodies of asbestos or other electrically chargeable material may in some instances be stationary in the liquid, but in most cases desirably take the form of endless belts or rotating drums, discs or the like, which are advanced along predetermined paths, and from which the contaminants are removed, as by suction, at predetermined removal locations along their paths of travel.

BRIEF DESCRIPTION OF THE DRAWINGS

The above and other features and objects of the invention will be better understood from the following detailed description of the typical embodiments illustrated in the accompanying drawings, in which:

FIG. 1 is a vertical section through a contaminant removing unit constructed in accordance with the invention;

FIG. 2 is a horizontal section taken on line 2—2 of FIG. 1;

FIG. 3 is a perspective representation of one of the vacuum type contaminant removing devices of FIG. 1;

FIG. 4 is a section taken on line 4—4 of FIG. 3;

FIG. 5 is a horizontal section taken on line 5—5 of FIG. 1;

FIG. 6 is a view similar to a portion of FIG. 2, but showing a variational form of the invention;

DESCRIPTION OF THE PREFERRED EMBODIMENTS

Figure 7:
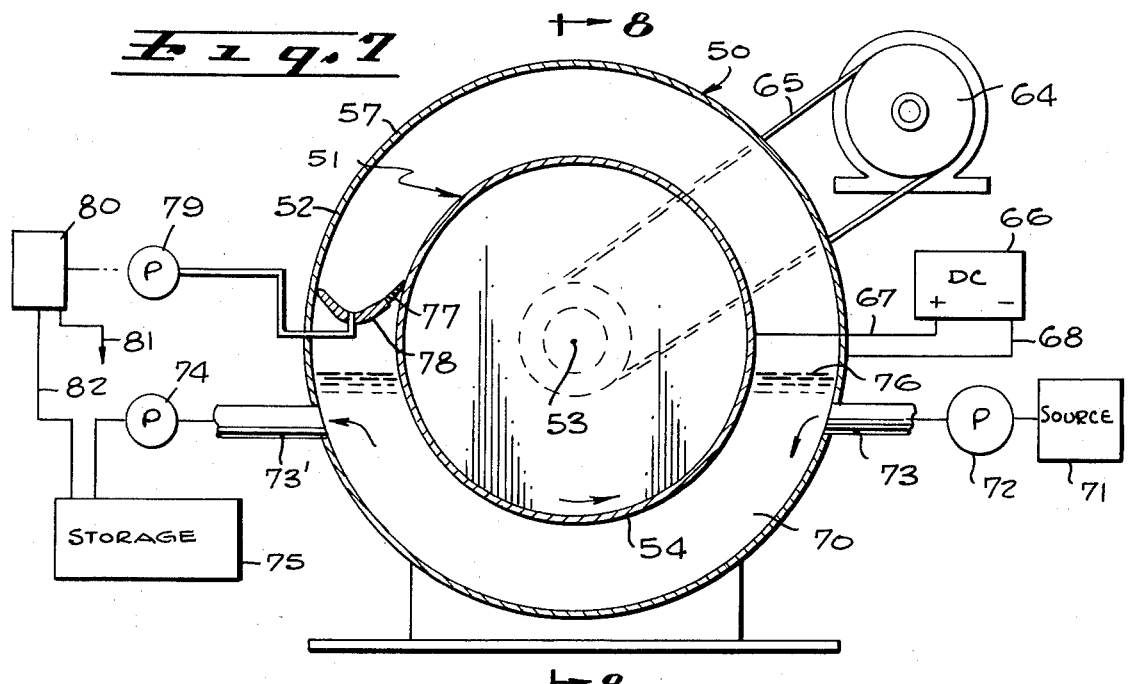
FIG. 7 is a vertical transverse section through another variational form of the invention.

With reference first to FIG. 1, there is illustrated at 10 in that figure a separator device embodying the present invention, and including an outer rectangular fluid tight housing 11 through which a hydrocarbon liquid 12 to be treated is passed. The housing 11 may be vertically elongated as shown, and have an inlet opening 13 near its upper end into which a line 14 is connected to deliver the liquid into the housing. From inlet 13, the liquid flows downwardly within a central vertical passage 14 for discharge from the housing through a bottom outlet 15 and typically to an appropriate storage tank 16. The movement of liquid through the housing is caused by a suitable pump represented at 17, which may take its suction from a tank or other source 18 of liquid to be treated.

At opposite sides of the liquid downflow passage 14, housing 11 contains two endless electrode belts 19 and 20, which are parallel to one another, and each of which is mounted at its upper and lower ends by a pair of rollers 21 and 22. These rollers are driven in a direction and at a speed to advance the inner adjacent vertical runs 23 of the belts slowly and continuously upwardly, and to advance the other vertical runs 24 downwardly. This drive may typically be taken from an electric motor as represented at 25 in FIG. 5, with this motor acting through gears 26 and 27 to drive the shafts 28 and 29 of the two lower rollers 22. Shafts 28 and 29 may be appropriately journaled in bearings 30, mounted in the sidewall of housing 11, and appropriately sealed to prevent leakage of any of the liquid from the interior of the housing. The upper rollers 21 may be similarly journaled, and may also be driven in timed relation to the lower rollers, or be idlers.

In the particular form of the invention shown in FIGS. 1 through 5, belts 19 and 20 are preferably formed of asbestos fibers (magnesium aluminum silicate), with these fibers desirably being woven into a fabric, and with the woven asbestos fabric preferably containing some reinforcing fibers having greater strength than the asbestos. For example, these reinforcing fibers may typically be formed of linen, nylon, cotton, or any other suitable material. The fabric is sufficiently loose and open to allow free access of the liquid to the interior of the spaces between and about the different individual asbestos fibers in the fabric, to thus present an extremely large asbestos surface area contacted by the liquid. To maximize this available surface area, it is preferred that the fabric contain no filler or binder or substance of any type within the spaces or pores between the fibers and coating the surfaces of the asbestos fibers. Also, the belts should of course have sufficient flexibility to bend freely as they pass about the rollers, and yet should be strong enough and heavy enough to withstand such flexure, and the other mechanical forces encountered in operation, over long periods of time without damage to the belts.

Within the space between the two vertical runs 23 and 24 of each asbestos belt, there may be provided a vertically elongated electrically insulative body 31, having the horizontal cross-section illustrated in FIG. 2, and shaped to occupy the entire space between the vertical runs of the associated belt, to prevent flow of any of the liquid within that space. On its inner surface, each of these insulative members 31 may carry an electrically conductive electrode plate 32, disposed within a vertical plane adjacent the inner run 23 of the associated belt, and continuously contacting the belt across its entire horizontal width, and vertically from the lower end 33 of the plate adjacent one of the rollers 22 to a location 34 near liquid inlet 13. The two belt contacting plates 32 are connected to opposite sides of a high voltage direct current power source 35 (FIG. 2), so that one of the plates 32 and the contacted portion of the corresponding belt is at a high positive potential, while the other plate and the contacting portion of that belt are at a corresponding negative potential. The conductive plates 32 may be formed of any suitable highly electrically conductive material capable of withstanding attack by the liquid being treated, or by any of its contaminants, and capable of withstanding the other conditions encountered in use. For example, these plates may in some instances be formed of copper, stainless steel, or the like.

The insulative members or bodies 31 which carry electrode plates 32 may be formed of a suitable preferably rigid resinous plastic material, capable of withstanding attack by the liquid and its contaminants. For example, these bodies may advantageously be formed of phenol-formaldehyde type resinous plastic material. It is also noted, as seen in FIG. 2, that the bodies or members 31 may have side flanges 36 extending vertically along their opposite sides, at opposite sides of the electrode plates 32 and runs 23 of the belts, to laterally confine and locate the belts as they move upwardly adjacent electrode plates 32.

At a location above the upper surface 37 of the liquid in housing 11, there are provided two pairs of vacuum cleaning elements 38, engaging opposite sides of the upwardly moving vertical runs of the two belts. These vacuum cleaning elements may take the form illustrated in FIGS. 3 and 4, each typically being formed of a rigid body of material having a planar vertically extending face 40 contacting one of the sides of the vertical run 23 of one of the belts, with this face 40 containing grooves or other recesses 41 extending transversely of the direction of movement of the belts and within which a vacuum is developed by one of two vacuum pumps 42 or 42' (FIG. 1), through a line 43 from the vacuum pump communicating with the grooves through interior passages 44 in the suction head 38. A vacuum is maintained in grooves 41 sufficiently below atmospheric pressure to withdraw all contaminant molecules from the asbestos into the grooves and to vacuum pumps 42 or 42', from which they are delivered into a receiver 45 or 45'. The two suction heads 38 associated with the lefthand belt in FIG. 1 are desirably connected to vacuum pump 42, while the two suction heads associated with the righthand belt are connected to the second vacuum pump 42'. The separated contaminant molecules from receivers 45 and 45' may be delivered to appropriate contaminant recovery units or separation units 46, within which the elemental sulfur, nitrogen, heavy metals and any other contaminant elements may be separated from the hydrocarbon portions of the contaminating molecules.

In describing the operation of the equipment, assume first of all that the hydrocarbon liquid being treated is a crude oil which contains undesirable contaminant molecules containing sulfur, nitrogen, oxygen, various metals, and the like. More particularly, sulfur may be present in mercaptans, disulfides, polysulfides, sulfones, sulfoxides, thionyl sulfides, sulfates, sulfites, and in other forms. Nitrogen may be present in amines (of the primary, secondary, tertiary, or heterocyclic type), hydrazines, hydroxylamines, nitrites, nitrates, various heterocyclic compounds containing sulfur, and the like. Oxygen occurs in some of the sulfur and nigrogen compounds listed above, and also may be present in naphthenic acids, phenolics, and any of numerous other hydrocarbon compounds containing carboxy, hydroxy, aldehyde, ether or keto groups or the like. The metals which may be present within some of the basically hydrocarbon molecules in the crude oil include vanadium (usually the most bothersome metallic constituent), nickel, iron, tungsten, molybdenum, zinc, magnesium, manganese, copper, chromium, and the like. All of these various contaminants containing sulfur, nitrogen, oxygen, metals, etc. are of the previously discussed type in which the individual molecules of the contaminants are dissolved in the hydrocarbon liquid, and are dipoles, that is, have the effective centers of their positive and negative electrical charges separated from one another, and in each instance have the charge or charges of one polarity more concentrated in a particular molecule than the charge or charges of the opposite polarity, so that each molecule will be attracted toward the particular asbestos electrode belt which has a polarity the opposite of the more concentrated charge in the molecule.

As the crude oil containing these contaminant molecules flows downwardly within space 14 in FIG. 1, in contact with the electrically charged portions of vertical runs 23 of the asbestos electrode belts, that is, the portions of the belts which contact and assume the potential of electrode plates 32, the high positive charge on one of the belts attracts certain of the contaminant molecules, and causes migration of those molecules toward its surface, while the negatively charged belt attracts other contaminant molecules and causes their migration toward its surface. More particularly, the mercaptans and other sulfur containing molecules migrate toward and accumulate on the belt which is maintained at a high positive potential, while the amines and other nitrogen containing molecules migrate toward and accumulate on the vertical upwardly moving run of the negatively charged belt. Any other contaminant molecule, containing a metallic group, or oxygen, or any other contaminant producing a molecule which is not a pure hydrocarbon, will similarly migrate toward one or the other of the belts, depending upon the electrical characteristics of the particular contaminant group involved: thus, the oil which leaves the apparatus through outlet 15 and accumulates in storage tank 16 contains a reduced percentage of these contaminants, and if treated sufficiently may be substantially free of all molecules which are not pure hydrocarbons.

As the upwardly moving vertical runs 23 of the two belts pass the upper ends 34 of electrode plates 32, the portions of the belts above location 34 immediately lose their charge, by reason of the very poorly conductive character of the asbestos, so that by the time they reach suction heads 38, the belts are completely uncharged electrically and the vacuum in those heads can easily withdraw the contaminant molecules from the surfaces of the individual asbestos fibers, to deliver the mercaptans, amines, metal containing molecules, and other contaminant substances to receivers 45 and 45', and then to contaminant units 46. The belts are thus substantially clean as they leave suction heads 38, and after moving downwardly at 24 to the bottom of the housing they again move upwardly in contact with electrode plates 32, and perform another contaminant removal operation.

Recovery units 46 may be of any conventional type, and act to replace the groups containing sulfur, nitrogen, oxygen, metal, and any other contaminants in the separated molecules with hydrogen, so that the sulfur, nitrogen, metals, etc. may be discharged at 47, and only saturated pure hydrocarbon molecules may be delivered through a line 48 into the same storage chamber 16 which receives the main body of cleaned liquid from housing 11.

In addition to crude oil, the process can function to similarly remove dissolved dipole contaminants from other hydrocarbon liquids, such as refinery product streams, including gasoline, kerosene, diesel oil, catalytic cracker cycle oil, platformer feed stock, etc., and any other contaminated hydrocarbon liquid.

The asbestos is especially effective for producing electrically induced migration of contaminant molecules, as discussed above, by reason of the presence on asbestos of a large number of adsorptive sites, which are readily available for adsorption of the contaminant molecules in large numbers, and which induce maximum migration of contaminant particles toward the asbestos and within the electrically nonconductive hydrocarbon liquid. The asbestos is also very effective because of its basically very poor conductivity, which enables it to be readily relieved of its electrical charge upon movement upwardly beyond the contact plates 32, to thus permit easy removal of the contaminants from the asbestos as through the suction heads 38 or by other appropriate removal means.

Various parameters may be adjusted in the above discussed apparatus of FIGS. 1 through 5, or in the apparatus of FIGS. 6 through 9 to be described hereinbelow, or in other variational apparatus embodying the invention, to produce a desired separating effect in a particular liquid being treated, and under particular conditions encountered. Certain of the critical parameters which may be varied are the following:

1. The spacing between the charged portions 23 of the two belts may be varied, with a greater separating effect being attainable by reducing this spacing, other conditions being equal.
2. The direct current voltage applied to the two upwardly moving portions 23 of the belts may be varied to increase or decrease the tendency for migration of the contaminant molecules to the asbestos surfaces. Generally, it is felt desirable that the applied voltage be at least about 1,000 volts per centimeter of separation between the charged portions of the belts or other electrodes (at their closest points), and preferably between about 1,000 and 25,000 volts per centimeter.
3. The belt speed may of course be varied to increase or decrease the period of contact of a particular portion of the belt with the liquid on each cycle of operation.

4. The length of the liquid path while in contact with the charged portions of the belts may be varied.
5. The velocity of flow of the liquid through the apparatus may be altered.
6. The viscosity of the liquid is of considerable importance in attaining a maximum rate of separation, with lower viscosities normally tending to increase the rate of separation.
7. Increases in temperature of the liquid being treated will by increasing the Brownian movement within the liquid usually tend to increase migration and therefore enhance separation in the present apparatus.
8. The migration potential of the particular contaminants being separated are of course of very great importance in calculating the required spacing, potentials, etc.

In any particular instance, it may be stated generally that the electrical portential required at the asbestos elements must be great enough, under the various conditions encountered, including all of those conditions listed above such as belt spacing, applied portential, belt speed, liquid path length and speed, viscosity, temperature, and migration potential, to cause the desired migration of the dissolved dipole contaminant molecules to the asbestos, for ultimate separation therefrom.

FIG. 6 shows fragmentarily a second form of the invention, which may be considered as identical with that of FIGS. 1–5 except that the asbestos belts 19a and 20a are rendered more conductive electrically than in the first form of the invention, and are connected to the power source only along the edges 48' of the belts. More particularly, the woven asbestos belts 19a and 20a may contain, in addition to the asbestos fibers themselves, a number of highly electrically conductive wires 49, extending both longitudinally and transversely of the belt, and forming a conductive matrix or screen arrangement for conducting electricity along the entire length of the belts. The wires may then contact vertical electrodes 32a carried along opposite edges of the insulative bodies 31a, for appropriately energizing the belts to cause the discussed contaminant removal. In this arrangement, the conductivity of the belts prevents them from losing their charge upon arrival at the suction heads 38 of FIG. 1, but because of their movement out of the liquid at that location, there is a reduced adherence of the contaminant molecules to the belts, with the applied suction being maintained at a level sufficient to remove the contaminant molecules under those conditions. The wires may be formed of any metal capable of withstanding the liquid and contaminants without damage to the metal or other adverse effect. For example, a suitable stainless steel may be employed for the purpose. It is also contemplated that the belts may in this arrangement be charged sufficiently at both sides of the bodies 31a to attract contaminants to both the upwardly moving and downwardly moving runs of the belts. For this purpose, the power supply terminals or contacts 32a may be provided at both sides of the bodies 32a, and the liquid flow path may be such as to direct the liquid past both runs of each belt.

Figure 8:
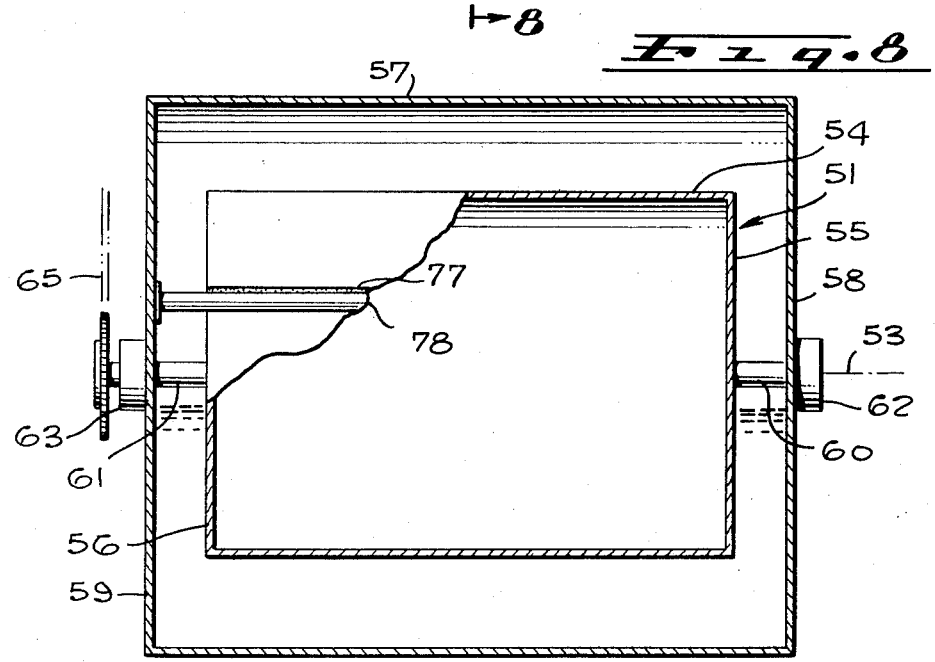
FIG. 8 is a vertical axial section taken on line 8—8 of FIG. 7.

FIGS. 7 and 8 show another variational form of contaminant remover 50 embodying the invention, including a cylindrical hollow drum 51 which is mounted within an outer housing 52 for relative rotation about a horizontal axis 53. The drum may be formed of a suitable electrically conductive metal, such as an appropriate steel, and has a typically imperforate cylindrical side wall 54 centered about axis 53, and two imperforate transverse end walls 55 and 56 closing opposite ends of the cylinder. Housing 52 may have a cylindrical wall 57 extending about and coaxial with wall 54 of drum 51, and closed at its opposite ends by two vertical parallel transverse walls 58 and 59. Two stub shafts 60 and 61 may project from opposite ends of drum 51, and be journaled by fluid tight sealed bearings 62 and 63 carried by the housing, to mount the drum for its rotation. Shafts 60 and 61 and the bearings 62 and 63 may be formed of electrically insulative material, or be otherwise appropriately insulated, to prevent the direct transmission of electricity between the drum and housing. A motor 64 drives drum 51 rotatively about axis 53 at an appropriate speed through a chain 65 or other suitable drive mechanism.

A direct current power source 66 corresponding to source 35 of FIG. 2 has one of its sides (the positive side of FIG. 7) connected to drum 51 by a suitable connection typically represented at 67 in FIG. 7, while the other side of the power source is connected to housing 52 at 68, so that the drum and housing form oppositely energized direct current electrodes of high potential both contacting the liquid 59 within annular chamber 70 between the drum and housing.

The petroleum or other hydrocarbon liquid containing contaminants is fed from a source 71 by a pump 72 into an inlet 73 leading into the right side of annular space 70 as seen in FIG. 7. This liquid flows about the underside of the drum to an outlet 73' from which it is delivered by a pump 74 to a storage tank 75 or other discharge unit. The drum 51 preferably turns in a counterclockwise direction as viewed in FIG. 7, so that the liquid follows a counterflow path relative to the drum.

The liquid preferably does not completely fill the annular space about the drum, but may rise only to a level near or slightly under the drum axis, as seen in FIGS. 7 and 8, so that only the underside of the drum is contacted by the liquid, while the upper side of the drum is exposed to a gaseous atmosphere, typically natural gas or the like. While the surface of the metal of the drum is moving through the liquid in contact therewith, in a left to right direction as viewed in FIG. 7, the high voltage charge on the drum causes migration of some of the contaminants toward its surface, in the same manner that contaminants are attracted toward the asbestos belts in FIGS. 1–5. These contaminants accumulate on the surface of the drum and then eventually move upwardly out of the liquid at the location 76. While thus out of contact with the liquid, the contaminants are removed in any appropriate manner from the surface of the drum, as by means of a rubber or plastic squeegee or wiper element 77 extending along the length of the drum and wiping the contaminants therefrom into an elongated axial trough 78 from which the contaminants are withdrawn by a pump 79 delivering the contaminant recovery unit 80 (corresponding to unit 45 of FIG. 1) which separates the contaminant elements from the hydrocarbon portions of the contaminant molecules, so that the contaminant elements may discharge at 81 and the hydrocarbon liquid be fed at 82 into storage tank 75.

Figure 9:
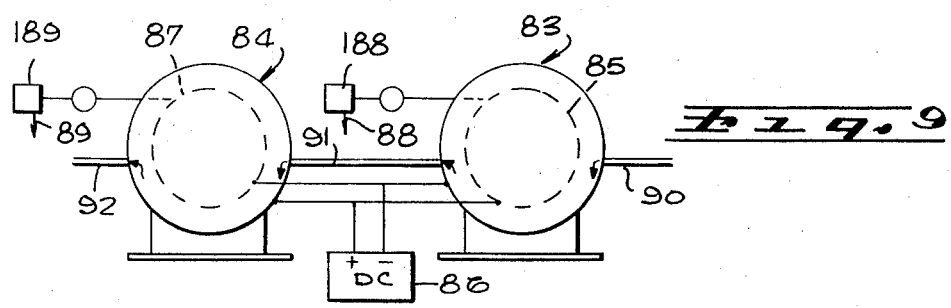
FIG. 9 is a view similar to FIG. 7 but showing two of the FIG. 7 devices connected in series.

As will be apparent, the drum may be either positively or negatively charged in FIGS. 7 and 8, to attract selectively either the sulfur contaminants and similar substances or the nitrogen and the like. FIG. 9 shows an arrangement in which two oppositely charged units 83 and 84 similar to unit 50 of FIG. 7 are connected in series, with the drum 85 of the first unit being connected to the positive side of direct current power source 86 while the drum 87 of the second unit is connected to the negative side of the powder source, so that the first drum attracts and separates out the sulfur contaminants and the like, which are discharged at 88 from contaminant recovery unit 188, while the second drum separates out the nitrogen type contaminants which are discharged at 89 from recovery unit 189. The contaminated hydrocarbon liquid initially enters the first unit 83 at 90, and then flows at 91 to the second unit, to ultimately discharge from this second unit at 92 in a condition free of contaminants or containing a substantially reduced quantity thereof.

In the arrangements of FIGS. 7 and 9 it has typically been assumed that the drums 51, 85 and 87 are imperforate, and that the liquid has all been received within a space about the drum. As an alternative arrangement which will require no illustration, it is contemplated that the cylindrical and end walls of these drums may if desired be perforated, so that the liquid may also flow to the interior of the drum for better contact therewith. Also, the walls of the drums may if desired be formed of a suitable screen formed of metal or the like, or may be partially or completely formed of asbestos, or any other suitable electrically conductive material capable of taking the electrical charge. As a further variation, the flow path of the liquid may be rearranged to introduce the liquid into the space about the drum while withdrawing it from the interior of the drum, or vice versa, so that the liquid is actually required to flow through a perforated or screen-form cylindrical wall of the drum formed of metal, asbestos, or another conductive material. Additionally, the contaminant attracting electrodes may in some cases be formed as rotary discs, moving or stationary plates, or in any other convenient form adapted to attain an effective contacting of the liquid with an appropriately charged element.

EXAMPLE I

In apparatus which was similar to that shown in FIG. 1 except that the housing was positioned to extend horizontally rather than vertically, and the liquid was allowed to fill the entire space within the housing, including the space at the location of suction heads 38, I treated 13,500 milliliters of crude oil taken from the Santa Maria, Calif. area. This crude oil is known to be high in both sulfur containing and nitrogen containing contaminants, the sulfur content at the input to the apparatus being 1.55 percent, and the nitrogen content being 0.82 percent. The asbestos belts were operated at a speed of 33.33 inches per minute, and each had a width of 3 inches, and a charged length of 33 inches. The spacing between the adjacent electrically charged runs 23 of the belts was 15 millimeters. The liquid being treated was passed through the apparatus at a rate of 100 milliliters per minute, and the potential applied to the two asbestos belts was 10,000 volts direct current, at 2.6 milliamperes. The total run time was 137 minutes and 55 seconds. During this interval, 2,000 milliliters of oil were removed by vacuum into receivers 45 and 45', constituting 14.85 percent of the total volume of the treated liquid. In the discharge line 15, the treated liquid contained only 1.13 percent sulfur, as compared with the 1.55 percent at the input, and contained a substantially reduced percentage of nitrogen through precise measurements of the nitrogen content were not obtained. In the receiver 45 which was connected to the positive side of the power source, the percentage of sulfur was 4.1 percent, showing much greater concentration than in the input liquid, while in the receiver 45' which was connected to the negative side of the power source, the percentage of sulfur was only 1.45 percent. The percentage of nitrogen in the negative receiver 45' was much greater than in the positive receiver, though as indicated above accurate measurements of the nitrogen were not obtained.

From these results, it is apparent that the apparatus was effective in removing substantial amounts of contaminating molecules from the liquid.

EXAMPLE II

In a static arrangement, in which instead of two moving belts there were utilized two electrically conductive plates coated with asbestos, which plates were 40 millimeters apart and had an area of 6 inches by 6 inches each, an electrical potential of 1,500 volts direct current was applied across the plates for a period of 6 hours. The liquid contained between the two plates was the same Santa Maria, Calif. crude oil referred to in Example I, which at the outset had a concentration of 1.55 percent sulfur and 0.82 percent nitrogen. After the six hour period, the liquid between the plates was found to contain only 1.0 percent sulfur and 0.11 percent nitrogen, indicating a removal of both types of contaminants from the liquid. The positive plate was lifted out of the liquid and cleaned by vacuum, with the oil thereon showing 4.8 percent sulfur and 0.32 percent nitrogen. The negative plate was lifted out of the liquid and cleaned by vacuum, and the oil removed therefrom showed 0.96 percent sulfur and 3.2 percent nitrogen. Thus, the sulfur removed from the liquid by the electrical asbestos process accumulated on the surface of the positively charged asbestos, while the nitrogen containing contaminants separated from the liquid accumulated on the negatively charged asbestos.

EXAMPLE III (KUWAIT CRUDE)

In the apparatus described in Example I above, I treated 13,500 milliliters of crude oil from Kuwait. The potential applied to the two asbestos belts was 5,000 volts direct current, and the total time of the run was 334 minutes. The other conditions were the same as in Example I. The sulfur content of the Kuwait crude was 2.77 percent, while the sulfur content of the treated oil at the output was only 1.91 percent, thus showing a substantial reduction in sulfur content. The concentration of sulfur in receiver 45 was 4.69 percent.

EXAMPLE IV (CYCLE OIL)

In the same apparatus referred to in Examples I and III, I treated 13,500 milliliters of refinery cycle oil, with the voltage and all other conditions being the same as in Example I. The total run time was 243 minutes. The sulfur content of the untreated oil was 1.04 percent, and the sulfur content of the treated oil was 0.64 percent. The sulfur content of the liquid in receiver 45 was 2.21 percent.

EXAMPLE V

A quantity of the same type of Santa Maria, California, crude oil referred to in Examples I and II above was filled into a rectangular aluminum container, and an aluminum plate was immersed in the oil, spaced 18 millimeters from the side walls of the container. The positive side of a direct current power source at 5,000 volts was connected to the container, and the negative side was connected to the plate, for a period of 240 minutes. The oil originally had a sulfur content of 1.55 percent. After the treatment period, the oil between the plate and container walls had a reduced sulfur content of 1.15 percent. The same test was repeated with the power source connections reversed, and the sulfur content reduction was from 1.55 percent to 1.2 percent.

While certain specific embodiments of the present invention have been disclosed as typical, the invention is of course not limited to these particular forms, but rather is applicable broadly to all such variations as fall within the scope of the appended claims.

I claim:

1. The process that comprises contacting two spaced electrodes with a hydrocarbon liquid containing contaminant molecules, consisting essentially of hydrocarbon molecules containing sulfur, nitrogen, vanadium and/or nickel, which are dissolved in the liquid and in which the effective centers of the positive and negative electrical charges of the individual contaminant molecules are separated from one another, giving the molecules a dipole moment; applying electrical charges of opposite polarity to said electrodes respectively from opposite sides of a direct current power source; causing migration of at least some of said contaminant molecules toward one of said electrodes by attraction thereto of electrical dipole charges of the individual molecules; and separating said attracted contaminant molecules, while still in solution in the hydrocarbon liquid in concentrated amounts, from the portion of the hydrocarbon liquid from which they have migrated.

2. The process as recited in claim 1, including directing a stream of said liquid along a treating path and past said electrodes.

3. The process as recited in claim 1, in which said separation of the contaminant molecules from the liquid includes removing the contaminant molecules from said one electrode, and decreasing the electrical charge on said one electrode during said removal of the contaminant molecules therefrom.

4. The process as recited in claim 1, including advancing said one electrode along a predetermined treatment path in contact with the liquid.

5. The process as recited in claim 1, including directing a stream of said liquid along a treating path and past said one electrode, and advancing said one electrode generally countercurrent to said liquid.

6. The process as recited in claim 1, in which said separation of the contaminant molecules from the liquid includes creating a vacuum adjacent said one electrode, and withdrawing the contaminant molecules from said one electrode by said vacuum.

7. The process as recited in claim 1, in which said one electrode is formed of asbestos.

8. The process as recited in claim 1, in which said hydrocarbon liquid is petroleum.

9. The process as recited in claim 1, in which said one electrode is formed of a metal.

10. The process as recited in claim 1, including moving said one electrode along a path such that it first contacts the liquid and then moves out of contact therewith, and removing said contaminant molecules from the electrode while it is out of contact with the liquid.

11. The process as recited in claim 1, in which said one electrode is an asbestos belt which moves along an endless path and contacts the liquid along only a portion of the path, said process including removing the contaminant molecules from said belt while it is out of contact with the liquid.

12. The process as recited in claim 1, in which said contaminant molecules include molecules containing hydrogen, carbon and sulfur, with a concentrated negative charge being present in the molecule at the location of the sulfur; said migration of the contaminant molecules being caused by attracting said concentrated negative charge toward a positively charged one of said electrodes.

13. The process as recited in claim 1, in which said contaminant molecules include molecules containing hydrogen, carbon and nitrogen, with a concentrated positive charge being present in the molecule at the location of the nitrogen; said migration of the contaminant molecules being caused by attracting said concentrated positive charge toward a negatively charged one of said electrodes.

14. The process as recited in claim 1, including causing the migration of others of said contaminant molecules toward the second of said electrodes by attraction thereto of electrical dipole charges of said molecules, and separating the contaminant molecules which are attracted toward said second electrode from the hydrocarbon liquid separately from the molecules which are attracted to said one electrode.

15. The process as recited in claim 1, in which the direct current potential applied to said electrodes is at a value of at least about 1,000 volts per centimeter of separation between the electrodes.

16. The process that comprises contacting two spaced electrodes with a hydrocarbon liquid having dissolved therein contaminant hydrocarbon molecules of at least two types containing sulfur and nitrogen respectively, both of said types of molecules having the effective centers of the positive and negative electrical charges of the individual molecules separated from one another, giving the molecules a dipole moment; applying electrical charges of opposite polarity to said electrodes respectively from opposite sides of a direct current power source having a voltage of at least about 1,000 volts per centimeter of separation between the electrodes; causing migration of said sulfur containing molecules to a positively charged one of said electrodes by attraction of the electrical dipole charge associated with the sulfur; causing migration of said nitrogen containing molecules toward a negatively charged one of said electrodes by attraction of the electrical dipole charge associated with the nitrogen; and separating said sulfur containing molecules and said nitrogen containing molecules, while still in solution in the hydrocarbon liquid in concentrated amounts, from the portion of the hydrocarbon liquid from which they have migrated.

17. The process as recited in claim 16, in which said electrodes are two endless asbestos belts, said process including advancing said belts along endless paths in a relation contacting said belts with the liquid and energizing the belts from said direct current source along first portions of said paths, and moving said belts out of contact with the liquid and out of energizing relation with said direct current source along second portions of said paths, said separating step including removing said contaminants from said belts while they are in said second portions of their endless paths.

* * * * *